Patented Feb. 1, 1949

2,460,266

UNITED STATES PATENT OFFICE 2,460,266

MANUFACTURE OF PLASTER OF PARIS

Cuthbert Leslie Haddon, Newark-on-Trent, England

No Drawing. Application November 4, 1944, Serial No. 562,043. In Great Britain December 17, 1942

1 Claim. (Cl. 106—112)

This invention relates to the manufacture of plaster of Paris, its object being to produce plaster of improved strength.

As disclosed in my U. S. Letters Patent No. 2,448,218, dated August 31, 1948, if ground gypsum or the precipitated dihydrate of calcium sulphate be heated in the presence of water in an autoclave at temperature between 120° and 170° C., the product is the hemihydrate consisting of thin rod or needle shaped crystals which on drying and regauging with water to a creamy consistency, require so much water for gauging that the mechanical strength after setting is complete is not good. The above mentioned process has long been known, and reference may be made to the specification of British Patents 3225/1903, 5853/1904 and 26,007/1903.

A great improvement was made by autoclaving lumps of gypsum around 120-125° C., drying and suitably regrinding and one such method is described in the U. S. Patent 1,901,051. A much smaller proportion of water is required for gauging the final product. The individual crystals are very much broader relative to their length than if the gypsum is first finely ground.

In some respects the manufacture of plaster is cheaper and more convenient when it proceeds from a basis of ground gypsum. One method of reducing the amount of water used for gauging is to autoclave in a 30 to 35% solution of magnesium sulphate and this is described in the U. S. Patent 1,989,712 of 1935. This method requires very careful washing of the final product, and large concentrations of magnesium sulphate.

In the process of my invention, I proceed from the basis of ground gypsum, adopting also the practice of autoclaving, that is to say effecting the partial dehydration in the presence of water in the liquid state, and under pressure.

By autoclaving is meant heating in the presence of liquid water until the change from gypsum (or dehydrate) to hemihydrate (or anhydrous calcium sulphate) is complete.

In the art of using plaster of Paris it is well known that certain substances operate to retard the setting of the plaster if they are added to the water used for gauging it, and such substances are known in the trade as "retarders." Among them are soluble protein substances, that is to say proteins, salts thereof, and products of the degradation of proteins by partial hydrolysis, where the hydrolysis has not proceeded beyond the peptone stage.

I have discovered that if the autoclaving of ground gypsum in water in the liquid state and under pressure is performed in the presence of such protein substances the crystals of hemihydrate produced are much squatter than the acicular crystals produced when the protein substances are absent. After filtering and drying the product (taking care to prevent setting as a result of permitting the solution to cool) much less water is required for gauging than is the case when the gypsum has been autoclaved in water only.

Examples of protein substances which I may use as catalysts for the purpose indicated are, besides the soluble protein themselves and their soluble salts, commercial keratin, glue, pepsin, peptones, and albumen and casein dissolved in alkali. Where the selected substance is a product of the partial hydrolization of a protein the hydrolization should not have proceeded beyond the peptone stage.

The quantity of catalyst required for producing good results is generally not more than 0.1% by weight of the gypsum, and may be substantially less. The autoclaving temperature should not be unduly high, because when it rises to 160° or thereabouts the squatness of the crystals tends to be reduced.

An example of the use of keratin is as follows: 0.04% of commercial keratin retarder was added to minus 80 mesh ground gypsum made into a thick slurry with water. The whole was heated to between 125°–160° C., preferably 138° C. for 2 hours in a stirred autoclave, filtered and dried. The product consisted of crystals of hemihydrate up to 150 microns in length and 30 to 40 microns in breadth.

There is probably some causal relationship between the retarding function of the protein substances, when they are added to the gauging water, and their function in modifying the crystal shape when they are added to the autoclaving water, but the two effects do not appear to be in direct proportion to each other. At any rate, in practice I have found that the most potent retarders are not always the catalysts which have the most effect on the crystal shape. It does, however, appear that in all cases the rate of change from gypsum to plaster is in the presence of the catalysts somewhat slower than when the autoclaving proceeds in water alone.

What I claim as my invention and desire to secure by Letters Patent of the United States is:

A process of producing plaster of Paris comprising mixing ground gypsum with water and substantially one part per thousand of keratin, heating the mixture thus obtained with agitation in a closed vessel at a temperature between 125° C. and 160° C. until the gypsum is converted into plaster of Paris consisting mainly of hemihydrate crystals of squat shape, the proportion of water being sufficient to maintain a liquid phase throughout the treatment.

CUTHBERT LESLIE HADDON.

REFERENCES CITED

The following references are of record in the file of this patent:

UNITED STATES PATENTS

| Number | Name | Date |
|---|---|---|
| 437,140 | Sickler | Sept. 23, 1890 |
| 1,901,051 | Randel et al. | Mar. 14, 1933 |

FOREIGN PATENTS

| Number | Country | Date |
|---|---|---|
| 5,853 | Great Britain | 1904 |